US012607249B2

(12) United States Patent
Lannutti

(10) Patent No.: US 12,607,249 B2
(45) Date of Patent: Apr. 21, 2026

(54) HIGH-OFFSET BELT TENSIONER WITH COUNTERBALANCE TORSION SPRING FORCE

(71) Applicant: MUVIQ S.r.l., Ivrea (IT)

(72) Inventor: Anthony E. Lannutti, Fayetteville, AR (US)

(73) Assignee: MUVIQ USA, LLC, Roseville, MI (US)

( * ) Notice: Subject to any disclaimer, the term of this patent is extended or adjusted under 35 U.S.C. 154(b) by 0 days.

(21) Appl. No.: 19/002,492

(22) Filed: Dec. 26, 2024

(65) Prior Publication Data

US 2025/0215958 A1 Jul. 3, 2025

Related U.S. Application Data

(60) Provisional application No. 63/614,984, filed on Dec. 27, 2023.

(51) Int. Cl.
*F16H 7/12* (2006.01)
*F16H 7/08* (2006.01)

(52) U.S. Cl.
CPC ..... *F16H 7/1218* (2013.01); *F16H 2007/081* (2013.01); *F16H 2007/0865* (2013.01)

(58) Field of Classification Search
CPC ............. F16H 2007/081; F16H 7/1218; F16H 2007/0865; F16H 2007/0893; F16H 7/1281
See application file for complete search history.

(56) References Cited

U.S. PATENT DOCUMENTS

| | | | | |
|---|---|---|---|---|
| 4,618,335 A | * | 10/1986 | Brandenstein | ........ F16H 7/1281 474/112 |
| 4,832,665 A | * | 5/1989 | Kadota | ................. F16H 7/1227 474/112 |
| 4,834,694 A | * | 5/1989 | Martin | .................... F16H 7/129 474/135 |
| 4,889,520 A | * | 12/1989 | Brandenstein | ........ F16H 7/1218 474/135 |
| 4,923,435 A | * | 5/1990 | Kadota | ................. F16H 7/1227 474/135 |
| 5,266,067 A | * | 11/1993 | Gapco | ................... F16H 7/1281 474/135 |

(Continued)

OTHER PUBLICATIONS

The International Search Report and Written Opinion, Application No. PCT/IB2024/063150, Feb. 12, 2025, 11 pages.

*Primary Examiner* — Henry Y Liu
(74) *Attorney, Agent, or Firm* — FisherBroyles, LLP; Susan M. Oiler

(57) ABSTRACT

A high-offset belt tensioner has a base having a pivot tube that defines a first axis of rotation, an arm having a pivot tube-receiving body rotatably seated over the pivot tube and having a pulley pivot tube that defines a second axis of rotation. A torsion spring is seated around an exterior surface of the pivot tube-receiving body with a first spring end attached to the base and a second spring end oriented and seated in the pulley pivot tube. A pulley is seated on the pulley pivot tube and rotatable thereabout. A dust cover is seated on the pulley pivot tube juxtaposed to the pulley and a first end of the pivot tube is deformed toward the dust cover to retain the pulley without the use of a pulley bolt.

15 Claims, 6 Drawing Sheets

(56) References Cited

U.S. PATENT DOCUMENTS

| | | | | |
|---|---|---|---|---|
| 5,288,276 | A * | 2/1994 | Golovatgai-Schmidt .................... F01L 1/024 | 474/135 |
| 5,470,279 | A * | 11/1995 | Brandenstein ........ F16H 7/1281 | 474/135 |
| 5,480,358 | A * | 1/1996 | Sakai .................... F16H 7/1227 | 474/135 |
| 5,620,385 | A * | 4/1997 | Cascionale .......... F16H 7/1218 | 474/135 |
| 5,630,767 | A * | 5/1997 | Hirabayashi ........ B60R 22/1954 | 474/135 |
| 5,702,315 | A * | 12/1997 | Sakai .................... F16H 7/1227 | 474/135 |
| 5,873,799 | A * | 2/1999 | Meckstroth .......... F16H 7/1281 | 474/135 |
| 6,001,037 | A * | 12/1999 | Rocca .................. F16H 7/1281 | 474/135 |
| 6,659,896 | B1 * | 12/2003 | Stief .................... F16H 7/1281 | 474/135 |
| 7,637,829 | B2 * | 12/2009 | Stone .................... F16H 7/1281 | 474/135 |
| 7,887,445 | B2 * | 2/2011 | Quintus ............... F16H 7/1218 | 474/135 |
| 7,918,755 | B2 * | 4/2011 | Baumuller ........... F16H 7/1236 | 474/135 |
| 7,980,976 | B2 * | 7/2011 | Stepniak ............... F16H 7/1281 | 474/135 |
| 8,075,433 | B2 * | 12/2011 | Quintus ............... F16H 7/1218 | 474/135 |
| 8,123,640 | B2 * | 2/2012 | Quintus ............... F16H 7/1218 | 474/135 |
| 8,292,765 | B2 * | 10/2012 | Rolando ............... F16H 7/1245 | 184/6.17 |
| 8,337,344 | B2 * | 12/2012 | Meano ................. F16H 7/1218 | 474/135 |
| 8,475,308 | B2 * | 7/2013 | Crist .................... F16H 7/1218 | 474/135 |
| 8,926,462 | B2 * | 1/2015 | Ward ........................ F16H 7/12 | 474/135 |
| 10,215,262 | B2 * | 2/2019 | Albrecht ............... F16H 7/1218 | |
| 10,989,280 | B2 * | 4/2021 | Dec ........................ F16H 7/1281 | |
| 11,125,305 | B2 * | 9/2021 | Güçlü .................. F16H 7/1281 | |
| 11,255,414 | B2 * | 2/2022 | Güçlü .................. F16H 7/1281 | |
| 11,353,092 | B2 * | 6/2022 | Baljozovic ........... F16H 7/0831 | |
| 11,421,561 | B2 * | 8/2022 | Gao .......................... F16G 1/04 | |
| 12,338,894 | B2 * | 6/2025 | Costa .................... F16H 7/1218 | |
| 2004/0235598 | A1 * | 11/2004 | Kawasaki ............. F16H 7/1218 | 474/135 |
| 2005/0181902 | A1 * | 8/2005 | Konanz ................. F16H 7/1218 | 474/135 |
| 2006/0100050 | A1 * | 5/2006 | Crist .................... F16H 7/1218 | 474/135 |
| 2006/0172837 | A1 * | 8/2006 | Quintus ............... F16H 7/1281 | 474/135 |
| 2006/0293135 | A1 * | 12/2006 | Quintus ............... F16H 7/1218 | 474/135 |
| 2009/0005202 | A1 * | 1/2009 | Crist .................... F16H 7/1218 | 29/446 |
| 2009/0011881 | A1 * | 1/2009 | Lehtovaara .......... F16H 7/1281 | 474/135 |
| 2009/0023528 | A1 * | 1/2009 | Dickson ............... F16H 7/1281 | 474/135 |
| 2009/0163312 | A1 * | 6/2009 | Stegelmann .......... F16H 7/1245 | 474/135 |
| 2009/0275432 | A1 * | 11/2009 | Dell .................... F16H 7/1281 | 474/135 |
| 2010/0113199 | A1 * | 5/2010 | Pflug .................... F16H 7/1281 | 474/112 |
| 2010/0222169 | A1 * | 9/2010 | Meano ................. F16H 7/1218 | 474/135 |
| 2010/0323833 | A1 * | 12/2010 | Quintus ............... F16H 7/1218 | 474/135 |
| 2011/0015017 | A1 * | 1/2011 | Serkh .................... F16H 7/1218 | 474/135 |
| 2011/0045929 | A1 * | 2/2011 | Rolando .............. F16H 7/1218 | 474/112 |
| 2011/0312454 | A1 * | 12/2011 | Comsa .................... F01L 1/024 | 474/135 |
| 2014/0038758 | A1 * | 2/2014 | Jindai .................. F16H 7/1218 | 474/135 |
| 2014/0213400 | A1 * | 7/2014 | Hallen ................. F16H 7/1218 | 474/135 |
| 2014/0287859 | A1 * | 9/2014 | Frankowski .......... F16H 7/1218 | 474/135 |
| 2014/0287860 | A1 * | 9/2014 | Ma ........................ F16H 7/1218 | 474/135 |

* cited by examiner

FIG. 1

HIGH-OFFSET BELT TENSIONER WITH COUNTERBALANCE TORSION SPRING FORCE

RELATED APPLICATIONS

This application claims the benefit of U.S. Provisional Application No. 63/614,984, filed Dec. 27, 2023, the entirety of which is incorporated herein by reference.

TECHNICAL FIELD

The present invention relates generally to high-offset belt tensioners and more particularly to a high-offset belt tensioner with a torsion spring in operative engagement with the tensioner arm via a spring tang seated in a pulley pivot tube upon which a pulley is journaled.

BACKGROUND

There is a need for an improved design of ZED-style belt tensioners in which the hub load force is counterbalanced by the torsion spring force using a robust spring and fewer parts.

SUMMARY

In all aspects, high-offset belt tensioners are described herein that have a base that includes a pivot tube defining a first axis of rotation, an arm having an arm arbor rotatably seated over the pivot tube and having a pulley pivot tube that defines a second axis of rotation, a torsion spring seated around an exterior surface of the arm arbor with a first spring end attached to the base and a second spring end oriented and seated in the pulley pivot tube, a pulley seated on the pulley pivot tube and rotatable thereabout, and a dust cover seated on the pulley pivot tube juxtaposed to the pulley, and characterized by a first end of the pivot tube being deformed toward the dust cover to retain the pulley without the use of a pulley bolt.

The first end of the pulley pivot tube defines a socket opening, opposite the second spring end, that is configured to receive a tool. The socket can have a plurality of teeth-receiving features. The second end of the pulley pivot tube has an annular bore comprising an axial flange extending inward toward the first end of the pivot tube.

The arm arbor defines an open window, and the tensioner further comprises a bushing seated within the arm arbor between the pivot tube and an interior surface of the arm arbor, the bushing having a protruding tab extending through the open window in active engagement with a coil of the torsion spring. The bushing comprises an axial slit opposite the protruding tab and is compressible against the pivot tube when the coil spring is wound against the exterior surface of the arm to damp movement of the arm.

The high-offset tensioner also has an arm plate seated in a collared bowl of the arm arbor in engagement with a first end of the pivot tube. The arm plate encloses the bushing in the arm. The arm plate is a rigid surface for the arm and the bushing to rotate against. The bushing has a plurality of troughs for retention of grease in a first surface facing the pivot tube and a second surface facing the arm plate.

The base of the tensioner has an arcuate tab engaged with an arcuate track in the pivot tube-receiving body of the arm. The arcuate track limits the degrees of rotation of the arm about the first axis of rotation. The base has a locating pin extending from a mounting surface of the base at a positioned opposite a spring abutment feature of the base.

The torsion spring can be an exposed torsion spring or an enclosed torsion spring.

In another aspect, the high-offset belt tensioner has a base having a pivot tube that defines a first axis of rotation, an arm having an arm arbor rotatably seated over the pivot tube and having a pulley pivot tube that defines a second axis of rotation, a torsion spring seated around an exterior surface of the arm arbor with a first spring end attached to the base and a second spring end oriented and seated in the pulley pivot tube, a pulley having a roller bearing thereof rotatably mounted to the pulley pivot, a dust cover seated on roller bearing, and is characterized in that the pulley pivot tube extends part way through the roller bearing and the second spring end of the torsion spring extends through the pulley pivot tube, through the roller bearing, and beyond the pulley, and a nut is seated on the second spring end of the torsion spring in engagement with the dust cover, and the nut defines a projection configured to receive a tool.

In one embodiment, the second spring end of the torsion spring is threaded and the nut has mating threading. In other embodiments, the second spring end of the torsion spring and the nut are soldered, are laser welded, or are fixed together by adhesive.

BRIEF DESCRIPTION OF THE DRAWINGS

Figure 1:
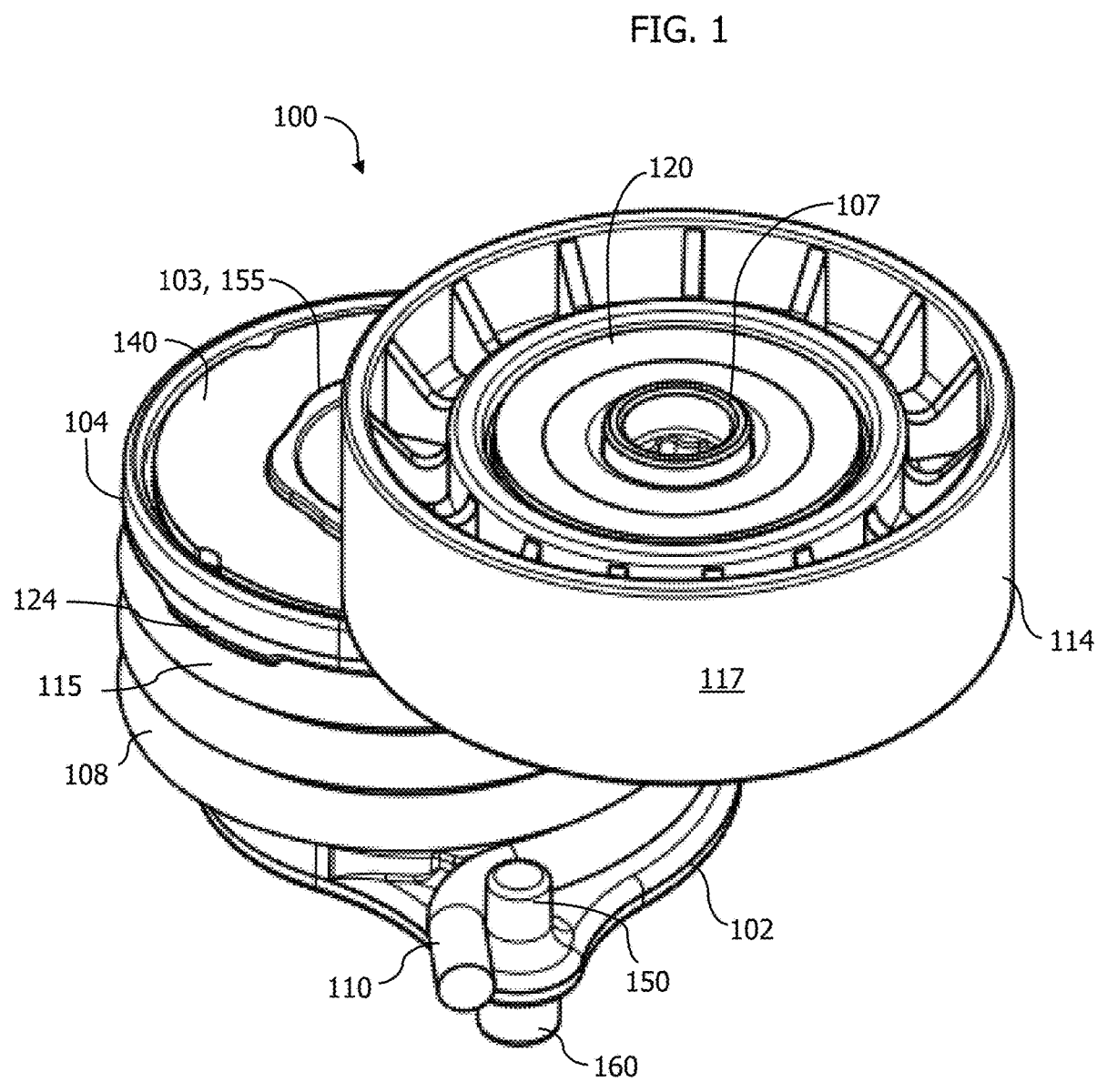

FIG. 1 is a side perspective view of a first embodiment of a high-offset belt tensioner.

DETAILED DESCRIPTION

Figure 2:
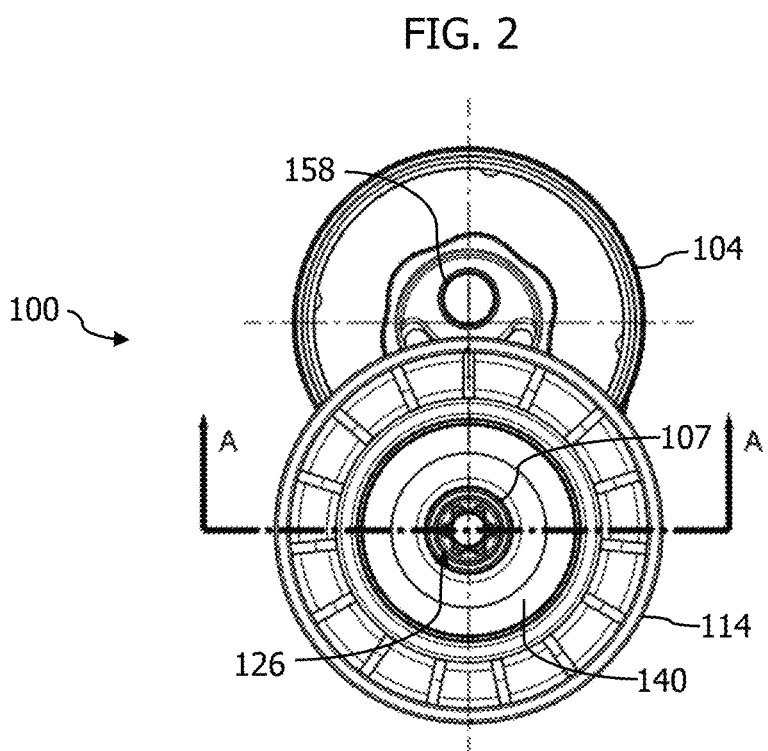
FIG. 2 is a top, plan view of the first embodiment.

The following detailed description will illustrate the general principles of the invention, examples of which are additionally illustrated in the accompanying drawings. In the drawings, like reference numbers indicate identical or functionally similar elements.

Figure 3:
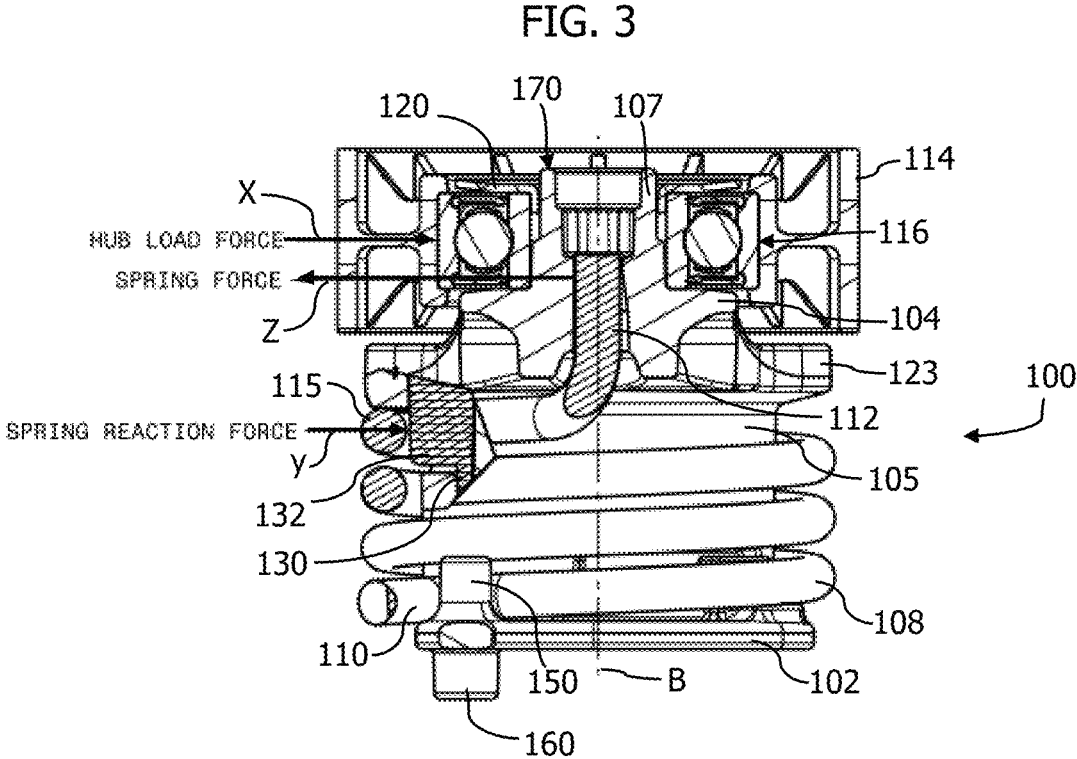
FIG. 3 is a longitudinal cross-sectional view along line A-A in FIG. 2.

Referring to FIGS. 1-4, a first embodiment of a high-offset belt tensioner 100 that provides tension upon an endless belt of a belt system often found in engine systems, such as a transmission belt system, is exemplified. A high-offset belt tensioner is also referred to as a Zed type belt tensioner. As labeled in FIG. 3, in a high-offset belt tensioner, a plane coincident with a hub load force (arrow X) that is transverse to the pulley rotation axis (B) is axially offset above a plane coincident with a torsion spring reaction force (arrow Y) in the main body of the tensioner 100. The tensioner 100 includes a support base 102 having a pivot tube 103 that defines a first axis of rotation (A), an arm 104 having a pivot tube-receiving body 105, also referred to as an arm arbor, rotatably seated over the pivot tube 103 and having a pulley pivot tube 107 that defines the pulley axis of rotation (B). A torsion spring 108 is seated around an exterior surface 109 of the arm arbor 105 with a first spring end 110 attached to the base 102 and a second spring end 112 oriented and seated in the pulley pivot tube 107. The orientation of the second spring end 112 as best seen in FIG. 3 is upward in alignment with rotational axis B. A pulley 114 is seated on the pulley pivot tube 107 and is rotatable thereabout. A dust cover 120 is seated on the pulley, more specifically on the roller bearing 116. FIG. 3 illustrates the assembly prior to the final manufacturing step of deforming the first end 170 of the pulley pivot tube 107, such as by radial riveting or swagging, toward the dust cover 120 to retain the pulley 114 without the use of a pulley bolt.

The pulley 114 is preferably journaled to the pulley pivot tube 107 by a roller bearing 116, visible in the cross-sectional view of FIG. 3. The pulley 114 has a belt-engaging surface 117. In the figures, the belt-engaging surface is shown as a flat surface, but it is not limited thereto. The belt-engaging surface can be textured or have ribs, such as V-ribs or cogs for belt engagement. The pulley can be made of any suitable material, whether metal, plastic, or a composite thereof. The dust cover 120 is coaxially mounted on the pulley pivot tube 107 to enclose the roller bearing and to secure the pulley 114. To seal the bottom of the pulley 114 against debris and contamination an annular seal (not shown), such as a V-ring, X-ring, or O-ring seal can be seated in operative engagement with the roller bearing 116 and an annular shoulder 123 of the arm 104 from which the pulley pivot tube 107 extends.

Referring to FIGS. 1-4, the torsion spring 108 applies a torsional spring force on the arm 104 in a direction toward a belt (i.e., a belt engaging direction) such that the pulley 114 applies a corresponding tension force upon the belt. Here, torsional spring 108 is a coil spring, such as a round wire coil spring. The coil spring is an exposed spring—there is no spring case present in which the torsion spring 108 is enclosed. This reduces the cost of the tensioner. As noted above, the torsion spring 108 has the second spring end 112 oriented and seated in the pulley pivot tube 107, which results in the torsion spring 108 moving with the arm and counteracting the hub load force through its entire sweep. With the second spring end 112 in the pulley pivot tube 107, the net force back to the pivot tube 103 of the base is zero. As labeled in FIG. 3, the spring reaction force Y pushes radially inward on a damper tab 132 protruding through an open window 122 in the arm arbor 105 of the arm 104 and directs this force to the spring abutment feature 150 of the base 102, i.e., to ground therethrough. One advantage provided thereby is the ability to reduce the amount of material in the arm 104 because the torsion spring 108 carries the load back to the pivot tube 103.

Figure 4:
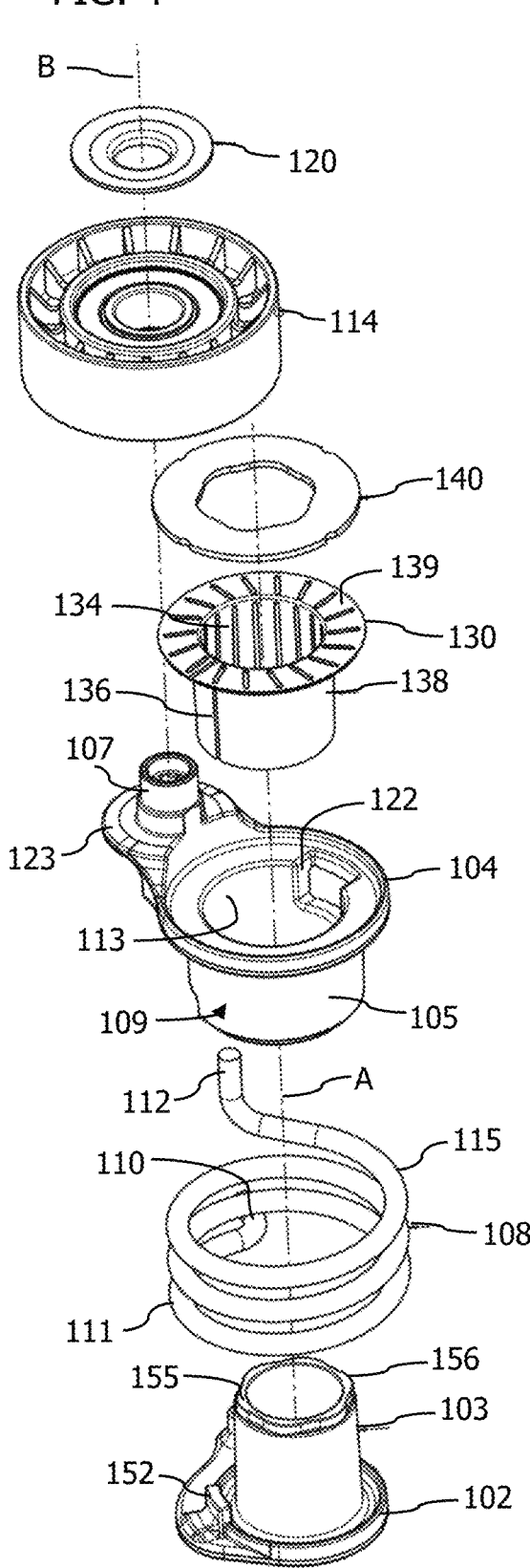
FIG. 4 is an exploded perspective view of the first embodiment.

The tensioner 100 further comprises a bushing 130 seated within the arm arbor 105 between the pivot tube 103 and an interior surface 113 of the arm arbor 105. The bushing 130 includes the damper tab 132 extending through the open window 122 of the arm and is in active engagement with a coil of the torsion spring 108 (see FIG. 3). The damper tab 132 is dimensioned such that it extends through the arm arbor 105 and is accessible to or by the spring 108 as the spring contracts (has a smaller outer diameter) upon winding. As best seen in FIG. 4, the bushing 130 includes a cylindrical body 138 having a first open end and a second open end, and an annular flange 139 extending radially outward from the first open end. The damper tab 132 protrudes outward from the cylindrical body 138 and is shaped to be received in the open window 122 of the arm arbor 105. With the damper tab 132 and window 122 so mated, the bushing 130 is rotatable with the arm 104. The cylindrical body 138 includes an axially oriented slit 136 through the cylindrical body 138 and through the annular flange 139, as such the slit 136 extends from the first open end to the second open end. The slit 136 is positioned generally opposite the damper tab 132.

During operation of the belt tensioner 100, when the torsion spring is wound tighter about the arm arbor 105, the damper tab 132 is pressed radially inward, which compresses the cylindrical body 138 of the bushing against the pivot tube 103 for frictional engagement therewith to damp movement of the arm. This provides positional frictional damping to the movement of an arm 104 as the spring is wound in response to a belt load or other prevailing force of the endless power transmitting element which is tightening in the span where the tensioner resides. The winding direction of the torsion spring 108 occurs when increasing tension causes the endless belt to lift the tensioner's arm 104 in a direction away from the endless belt. The tensioner resists rotating in the winding direction with a frictional damping force as the spring torque increases but reduces the frictional damping force when the torque decreases.

Figure 5:
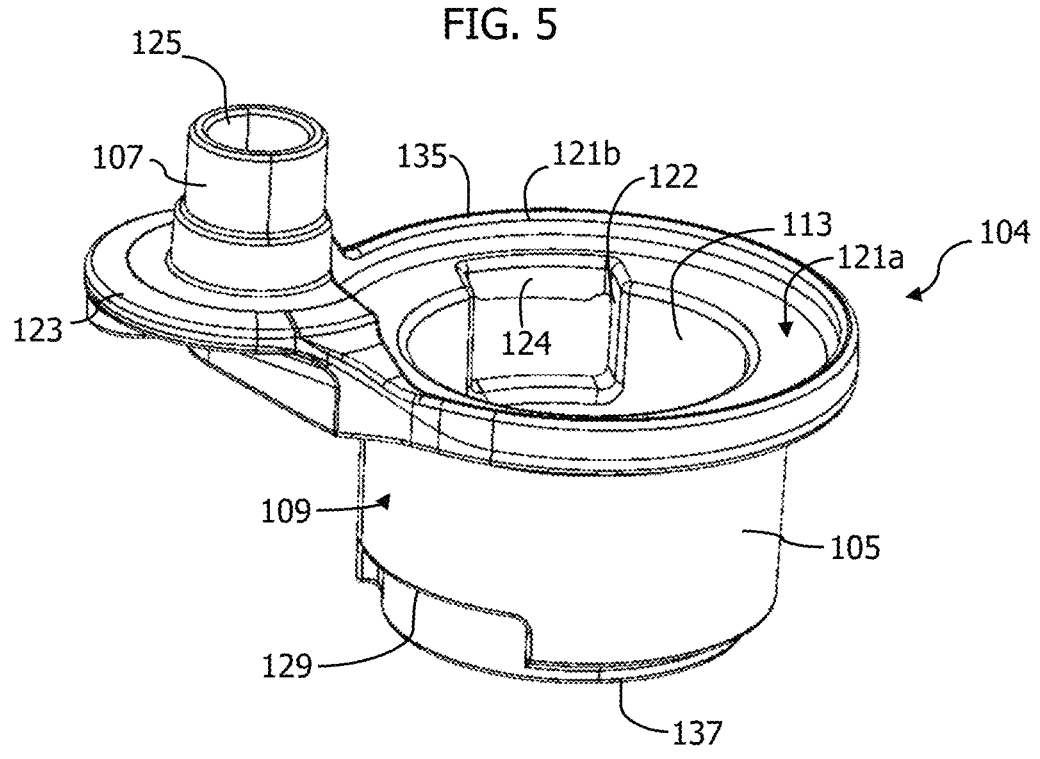
FIG. 5 is a side perspective view of the arm of the first embodiment.
Figure 6:
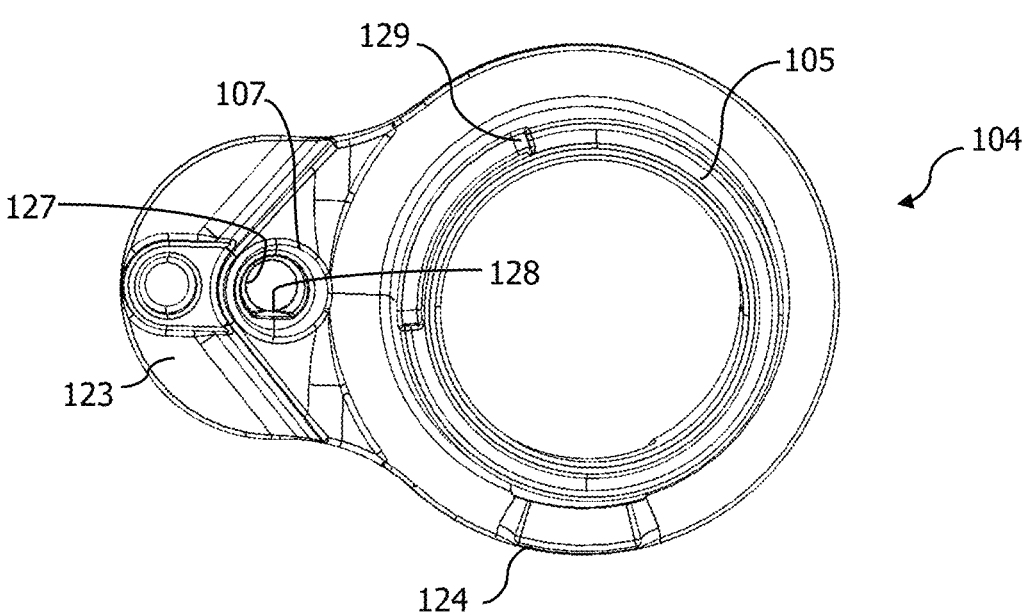
FIG. 6 is a bottom plan view of the arm.

With reference to FIGS. 4 and 5, the pivot bushing 130 is seated with the annular flange 139 between an upper surface 121*a* of the arm arbor 105 and the arm plate 140. The bushing 130 is typically formed from wear resistant plastic and has a plurality of troughs 134 for retention of grease in a first surface facing the pivot tube 103 and a second surface facing the arm plate 140. The annular flange 139 and the bushing 130, as a whole, act as a bearing surface for the rotation and translation of elements of the tensioner along and about the pivot axis. While the bushing 130 in this embodiment is a wear resistant plastic, it is within the scope of the invention to use other suitable bushing materials or bearing structures.

Referring to FIGS. 3-6, the arm arbor 105 extends from the arm 104 about the first axis A. The arm arbor 105 is shaped as a cylindrical sleeve that has an open top end 135 and an open bottom end 137, relative to the orientation of the page with respect to FIGS. 4 and 5. The arm arbor 105 defines an open window 122 therethrough, i.e., a slot that is open from the exterior surface 109 of the arm arbor 105 to the interior surface 113 thereof. The open window 122 is located most proximate the open top end 135 and proximate the pulley pivot tube 107 such that a last coil 115 of the torsion spring 108 extending from the second spring end 112 will be in operative engagement with the damper tab 132 of the bushing 130 which is seated in the open window 122, as shown in FIGS. 1 and 3. The open window 122 has an exterior overhang 124 that is shaped to receive the last coil 115 of the torsion spring 108 to aid in holding the last coil against the damper pad 132.

As best seen in FIG. 5, the open top end 135 of the arm arbor 105 can be shaped as a collared radially extending shoulder that defines an upper surface 121*a* surrounded by a rim 121*b*. The collared radially extending shoulder will receive therein, the annular flange 139 of the bushing 130 and the arm plate 140. The arm 104 can have an arcuate track 129 recessed into the arm arbor 105 proximate the bottom end 137. The arcuate track 129 defines or limits the degrees of rotation of the arm 104 about the first axis of rotation A. In the assembled state, the top end 135 of the arm arbor 105 is closed by the arm plate 140 and the bottom end 137 is seated on the base 102 to close the bottom end 137 as well.

The arm 104 also includes the pulley pivot tube 107. The pulley pivot tube 107 has a top bore 125 (labeled in FIG. 5) and a bottom bore 127 (labeled in FIG. 6). The interior surface of the bottom bore 127 can include a spring tang registration feature 128. The spring registration feature 128 may be a flat surface or flat wall segment for a portion of the generally cylindrical bore 127. In another embodiment, the spring registration feature can be a key or keyway mateable to a respectively opposite feature on the second spring tang 112. The top bore 125 defines a recessed socket 126 therein, best seen in FIG. 2. The socket 126 is configured to receive a tool, especially a tool for lifting the tensioner arm (applying a force to the torsion spring to move the arm) once installed in an engine system to enable positioning of the endless belt around the pulley's belt engaging surface 117. In one embodiment, the socket 126 has a plurality of teeth-receiving features. The socket should have an adequate number of teeth-receiving features to reduce stripping the socket via slipping of the tool.

Turning now to FIGS. 1-4 and 7-8, the base 102, which includes the pivot tube 103, also includes a spring abutment feature 150 against which a first spring tang 110 is operatively seated to bias the arm 104 in the belt tensioning direction. The spring abutment feature 150 may be a protrusion on or a recess in the base 102. Opposite the spring abutment feature 150 is a registration pin 160 protruding downward away from the bottom surface 162, which may be referred to as the mounting surface, of the base. The registration pin 160 is configured to be received in a mating receptacle of an engine surface that is positioned to seat the belt tensioner 100 appropriately for engagement of an endless belt. The base 102 can include an arcuate tab 152 that is configured for engagement with the arcuate track 129 in the arm arbor 105. Extending radially outward from the arcuate tab 152 is a spring cradle 154. The spring cradle 154 is configured for a first coil 111 of the torsion spring to sit therein. The first coil 111 is the coil that extends from the first spring end 110.

Figure 7:
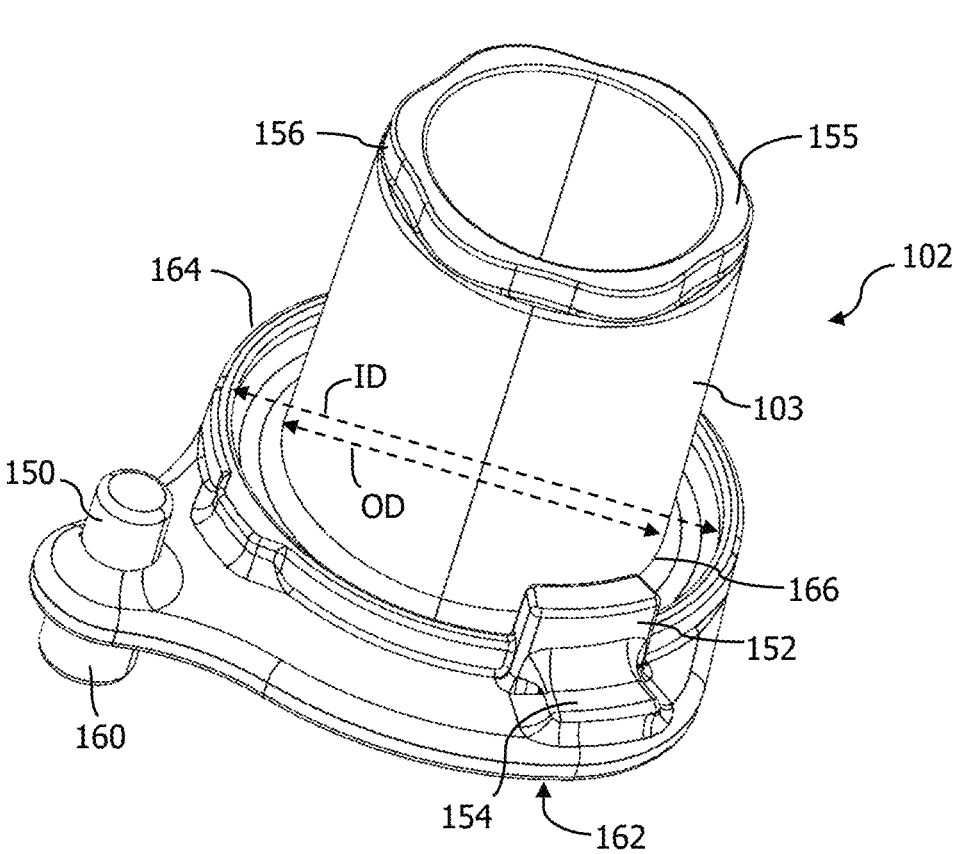
FIG. 7 is a side perspective view of the base of the first embodiment.
Figure 8:
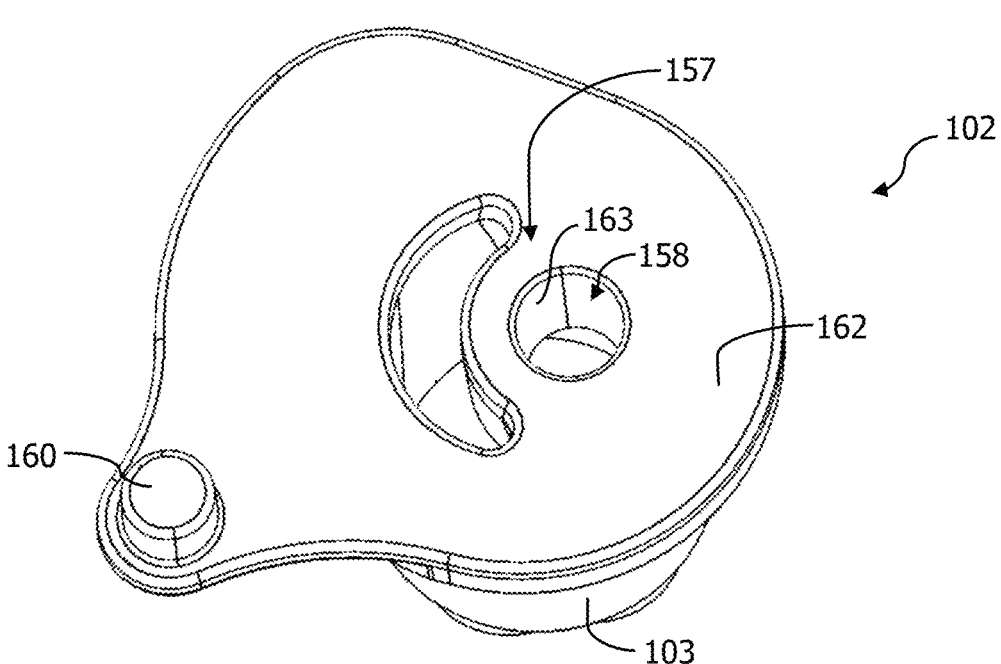
FIG. 8 is a bottom perspective view of the base.

Referring to FIGS. 7 and 8, the pivot tube 103 is open at its free end 155 and is generally closed at its opposing end 157. The opposing end 157 defines a bore 158 therethrough (best seen in FIGS. 2, 8, and 10) configured to receive a mounting bolt for mounting the base 102, and hence the belt tensioner 100, to an engine surface. The bore 158 can include an axial flange 163 extending inward toward the free end 155 of the pivot tube 103. The base 102 can include an annular flange 164 protruding axially upward in surrounding relationship to the pivot tube 103 and having an inner diameter ID that is greater than the outer diameter OD of the pivot tube 103 to space the annular flange 164 a distance from a base 166 of pivot tube 103. The gap defined therebetween is configured to receive the bottom end 137 of the arm arbor 105, thereby closing the arm arbor when the arm 104 and the base 102 are mated together in the assembled state. The free end 155 of the pivot tube 103 terminates with a splined or fluted exterior surface 156 configured for receiving the arm plate 140.

Referring again to FIGS. 1 and 4, the arm plate 140 is seated on the collared radially extending shoulder of the arm 104 in keyed engagement to a free end 155 of the pivot tube, more specifically with the splined or fluted exterior surface 156 of the pivot tube. The arm plate 140 encloses the bushing 130 in the arm 104. The arm plate 140 can be deformed during the installation procession to act as a spring plate to hold the components together. Examples of such methods are found in U.S. Pat. Nos. 6,575,860 and 9,249,866.

Figure 9:
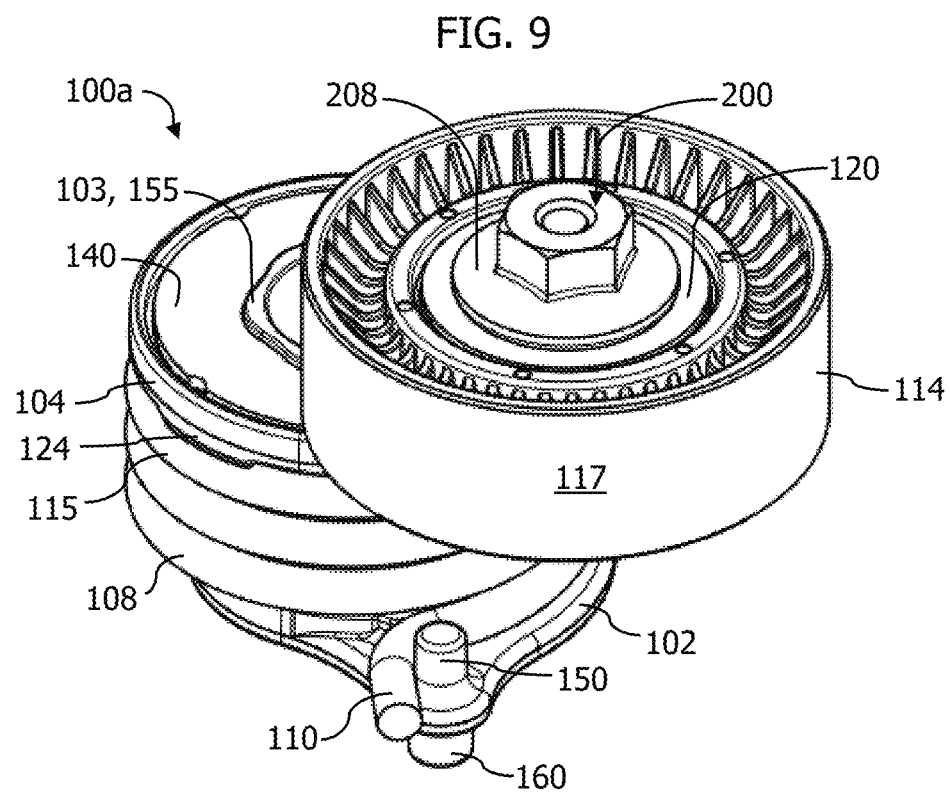
FIG. 9 is a side perspective view of a second embodiment of a high-offset belt tensioner.
Figure 10:
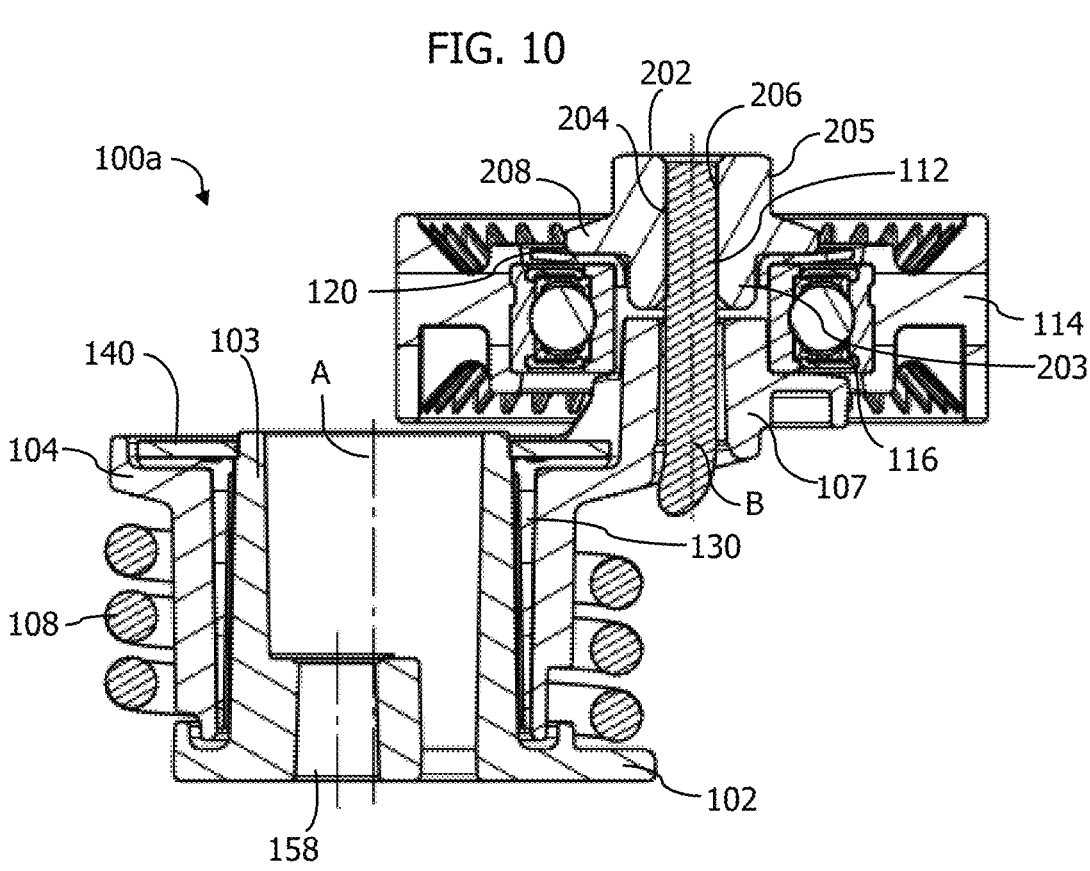
FIG. 10 is a longitudinal, cross-sectional view of the second embodiment.

Turning now to FIGS. 9 and 10, a second embodiment of a belt tensioner 100a is presented that includes the same main body and components as the first embodiment, thereby all reference numbers being the same. The difference in this second embodiment is the pulley's lifting mechanism 200 for installation of the belt tensioner, rather than having a recessed socket as part of the pulley pivot tube 107, the pivot tube 107 is shortened and a nut 202 is present that has a pivot post 203 seated in the roller bearing 116 and a projection 205 extending upward axially away from the pulley 114. The nut 202 is threaded on to the second tang 112 of the torsion spring 108. The second tang end 112 includes threading 240 and the nut 202 includes mating threading 206 in an internal bore thereof. The nut 202 has an annular flange plate 208 extending radially outward therefrom. In the assembled state, the annular flange plate 208 seats against the dust cover 120 and retains the same in place to protect the bearing 116 of the pulley 114 from contaminants and debris. The nut to second spring end attachment is not limited to threading. In other embodiments, the second spring end of the torsion spring and the nut are soldered, are laser welded, are fixed together by adhesive, or any equivalent thereof.

In operation, during normal tensioning, when a belt presses against pulley 114 that is attached to the arm 104, the arm will rotate about the pivot axis A thereby winding the torsion spring 108. The torsional spring upon winding will apply spring torque against the arm 104 to move, hold, or press the arm and pulley against the belt. As seen in FIG. 3, spring 108 is seated with its last coil 115 juxtaposed to the damper tab 132 of the bushing 130. Accordingly, when the arm 104 rotates in response to belt loading or other prevailing force(s) of the endless power transmitting element which is tightening in the span where the tensioner resides, the spring 108 will wind, decreasing the coil diameter, and radially contracting its coils into the damper tab 132, thereby directing the bushing 130 into frictional engagement with the pivot tube 103 of the base 102 to provide asymmetric damping. Then, when the belt loading or other prevailing force of the power transmitting element dissipates, the torque built up in the spring 108 urges the arm 104 to rotate in the tensioning direction T as the spring returns to its less wound state. As the spring 108 returns to its less wound state, the forces are reduced on the damper tab 132 and the bushing 130 disengages its frictional engagement with pivot tube 103 of the base 102.

The arm 104 and base 102 can be manufactured from die-cast aluminum or other metals and some plastics if of sufficient strength for use in a vehicle engine environment. In one embodiment, the metal material is an aluminum or aluminum alloy. The torsion spring 108 may be manufactured from steel, but other suitable alternative materials (or combination of materials/components) to construct the spring are also contemplated. The arm plate 140 is, in an exemplary embodiment, a hardened steel plate and the bushing 130 is typically made of a wear resistant plastic. The wear resistant plastic can be, but is not limited to, all polyamides (PA) including 66 nylon, 6 nylon, 11 nylon, 12 nylon, 69 nylon, 612 nylon, and 610 nylon, polyamide 46 nylon; polyethermides (PEI); polysulfones (PSU); polyethersulfones (PES); polyoxymethylenes (POM), or acetals; polyetheretherketones (PEEK); polyphenylene sulfides (PPS); polypthalamides (PPS), or amodels; polyphenylene sulfides (PPO); and amorphous nylons.

The belt tensioners discussed herein have numerous advantages, many of which have been already discussed above. Some additional advantages are provided in this paragraph. The belt tensioners disclosed herein are advantageous because it eliminates the pulley bolt, which is more cost effective, and enables a spring end to be positioned inside the pivot tube of the pulley (in place of the bolt) for improved counterbalancing of the hub load. More specifically, the torsion spring, which can be a very durable round wire spring, has a spring force that counterbalances the hub load force and the spring reaction force, and the spring moves with the arm counteracting the hub load force through the entire rotation of the arm. Moreover, without the pulley bolt, the bearing/pulley is secured to the pivot tube by deforming the top of the pivot tube towards the dust cover and/or a mounting ring by methods such as radial riveting or swaging, which prevents distortion of the inner race and is quicker to install. This design allows the arm of the belt tensioner to be as short as possible while the pulley can be as large as possible. Also, without a bolt, the opposing end of the pulley pivot tube can define a socket for receiving a tool to wind the tensioner during installation of the belt. Since the socket is a recessed feature, no decking height is added to the belt tensioner.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A high-offset belt tensioner comprising:
a base having a pivot tube that defines a first axis of rotation;
an arm having an arm arbor rotatably seated over the pivot tube and having a pulley pivot tube that defines a second axis of rotation;
a torsion spring seated around an exterior surface of the arm arbor with a first spring end attached to the base and a second spring end oriented and seated in the pulley pivot tube;
a pulley seated on the pulley pivot tube and rotatable thereabout; and
a dust cover seated on the pulley pivot tube juxtaposed to the pulley;
wherein a first end of the pulley pivot tube is deformed toward the dust cover to retain the pulley without the use of a pulley bolt.

2. The high-offset belt tensioner of claim 1, wherein the first end of the pulley pivot tube defines a socket opening, opposite the second spring end, that is configured to receive a tool.

3. The high-offset belt tensioner of claim 2, wherein the socket has a plurality of teeth-receiving features.

4. The high-offset belt tensioner of claim 2, wherein the second end of the pulley pivot tube has an annular bore comprising an axial flange extending inward toward the first end of the pivot tube.

5. The high-offset belt tensioner of claim 1, wherein the arm arbor defines an open window, and the tensioner further comprises a bushing seated within the arm arbor between the pivot tube and an interior surface of the arm arbor, the bushing having a protruding tab extending through the open window in active engagement with a coil of the torsion spring.

6. The high-offset tensioner of claim 5, wherein the bushing comprises an axial slit opposite the protruding tab and is compressible against the pivot tube when the coil spring is wound against the exterior surface of the arm to damp movement of the arm.

7. The high-offset tensioner of claim 5, further comprising an arm plate seated in a collared bowl of the arm arbor in engagement with a first end of the pivot tube, wherein the arm plate encloses the bushing in the arm.

8. The high-offset tensioner of claim 7, wherein the arm plate is a rigid surface for the arm and the bushing to rotate against.

9. The high-offset tensioner of claim 7, wherein the bushing has a plurality of troughs for retention of grease in a first surface facing the pivot tube and a second surface facing the arm plate.

10. The high-off-set belt tensioner of claim 1, wherein the base comprises an arcuate tab engaged with an arcuate track in the pivot tube-receiving body of the arm, wherein the arcuate track limits the degrees of rotation of the arm about the first axis of rotation.

11. The high-offset belt tensioner of claim 1, wherein the base comprises a locating pin extending from a mounting surface of the base at a positioned opposite a spring abutment feature.

12. The high-offset belt tensioner of claim 1, wherein the torsion spring is an exposed torsion spring.

13. A high-offset belt tensioner comprising:
a base having a pivot tube that defines a first axis of rotation;
an arm having an arm arbor rotatably seated over the pivot tube and having a pulley pivot tube that defines a second axis of rotation;
a torsion spring seated around an exterior surface of the arm arbor with a first spring end attached to the base and a second spring end oriented and seated in the pulley pivot tube;
a pulley having a roller bearing thereof rotatably mounted to the pulley pivot;
a dust cover seated on roller bearing;
wherein the pulley pivot tube extends part way through the roller bearing and the second spring end of the torsion spring extends through the pulley pivot tube, through the roller bearing, and beyond the pulley;
a nut is seated on the second spring end of the torsion spring in engagement with the dust cover, and the nut defines a projection configured to receive a tool.

14. The high-offset belt tensioner of claim 13, wherein the second spring end of the torsion spring is threaded and the nut has mating threading.

15. The high-offset belt tensioner of claim 14, wherein the second spring end of the torsion spring and the nut are soldered, are laser welded, or are fixed together by adhesive.

* * * * *